United States Patent
Lee et al.

(10) Patent No.: US 11,290,201 B2
(45) Date of Patent: Mar. 29, 2022

(54) METHOD AND APPARATUS FOR DETECTING SYNCHRONIZATION SIGNAL IN WIRELESS COMMUNICATION SYSTEM

(71) Applicant: Samsung Electronics Co., Ltd., Suwon-si (KR)

(72) Inventors: Haechul Lee, Yongin-si (KR); Myungjoon Shim, Suwon-si (KR); Bora Lim, Seoul (KR); Sungyoon Cho, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 48 days.

(21) Appl. No.: 16/991,744

(22) Filed: Aug. 12, 2020

(65) Prior Publication Data
US 2021/0184783 A1 Jun. 17, 2021

(30) Foreign Application Priority Data
Dec. 13, 2019 (KR) .................. 10-2019-0167145

(51) Int. Cl.
*H04J 11/00* (2006.01)
*H04W 92/18* (2009.01)

(52) U.S. Cl.
CPC ....... *H04J 11/0086* (2013.01); *H04J 11/0073* (2013.01); *H04J 11/0076* (2013.01); *H04W 92/18* (2013.01)

(58) Field of Classification Search
CPC .............. H04J 11/0086; H04J 11/0073; H04J 11/0076; H04J 11/0089; H04W 92/18
See application file for complete search history.

(56) References Cited

U.S. PATENT DOCUMENTS

| | | | | |
|---|---|---|---|---|
| 7,693,123 B2* | 4/2010 | Rudolf | ................. | H04B 1/7083 370/342 |
| 8,331,347 B2* | 12/2012 | Kishiyama | ........... | H04J 11/0069 370/350 |
| 8,687,620 B2* | 4/2014 | Malladi | ............... | H04L 27/2655 370/350 |

FOREIGN PATENT DOCUMENTS

| | | |
|---|---|---|
| JP | 2006-319765 A | 11/2006 |
| JP | 2011-234220 A | 11/2011 |
| KR | 10-0652373 | 8/2005 |
| KR | 10-1629680 | 6/2016 |

* cited by examiner

*Primary Examiner* — Hashim S Bhatti
(74) *Attorney, Agent, or Firm* — Harness, Dickey & Pierce, P.L.C.

(57) ABSTRACT

An operation method of an electronic device including: dividing a cell search period into a plurality of partial detection ranges based on the number of partial buffers and a size of the partial buffer; obtaining a first correlation detection information based on a first synchronization signal, while temporarily storing first signals in a first partial buffer among the partial buffers, in which the first signals are received during a first partial detection range among the plurality of partial detection ranges; and obtaining a second correlation detection information for the first signals based on the first correlation detection information and a second synchronization signal, during a second partial detection range among the plurality of partial detection ranges and obtaining the first correlation detection information for second signals based on the first synchronization signal, while temporarily storing the second signals received during the second partial detection range in a second partial buffer.

18 Claims, 11 Drawing Sheets

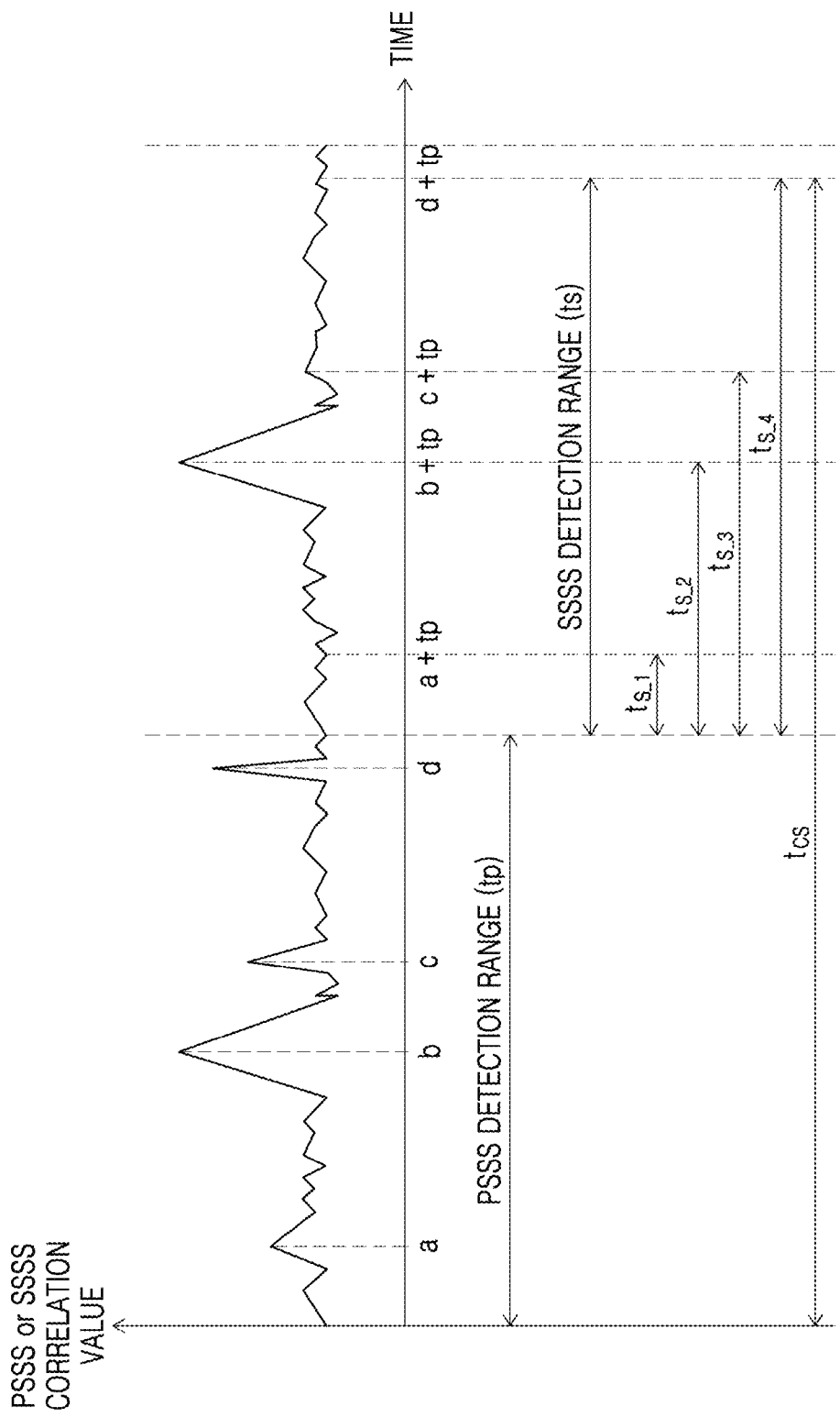

METHOD AND APPARATUS FOR DETECTING SYNCHRONIZATION SIGNAL IN WIRELESS COMMUNICATION SYSTEM

CROSS-REFERENCE TO RELATED APPLICATION

This application claims the benefit of Korean Patent Application No. 10-2019-0167145, filed on Dec. 13, 2019, in the Korean Intellectual Property Office, the disclosure of which is incorporated herein in its entirety by reference.

BACKGROUND

Example embodiments of the inventive concepts relate to a wireless communication system. For example, at least some example embodiments, relate to a method and/or an apparatus for detecting a synchronization signal in a wireless communication system supporting sidelink communication.

In the wireless communication system, a synchronization signal may be used for cell search or synchronization of user equipment (UE). In the wireless communication system such as long term evolution (LTE) or 5G, the UE may search a cell formed by a base station (BS) by detecting a synchronization signal to be broadcasted from the base station.

Recently, with the development of internet of things (IoT), a sidelink communication system including device to device (D2D) or vehicle to everything (V2X) communication has been attracting attention. In the sidelink communication system for D2D or V2X, the synchronization signal may be transmitted at different periods from the LTE or 5G communication system, and may include a primary sidelink synchronization signal (PSSS) and a secondary sidelink synchronization signal (SSSS).

SUMMARY

Example embodiments of the inventive concepts relate to a cell search method of an electronic device, a method of performing cell search by performing primary sidelink synchronization signal (PSSS) detection and secondary sidelink synchronization signal (SSSS) detection in parallel, and/or an apparatus performing the same.

According to an example embodiment of the inventive concepts, a method of operating an electronic device includes dividing a cell search period into a plurality of partial detection ranges based on a number of partial buffers included in the electronic device and a size of the partial buffers; obtaining, based on a first synchronization signal, first correlation detection information for first signals received during a first partial detection range among the plurality of partial detection ranges, while temporarily storing the first signals in a first partial buffer among the partial buffers; obtaining, based on the first correlation detection information for the first signals and a second synchronization signal, second correlation detection information for the first signals, during a second partial detection range among the plurality of partial detection ranges; and obtaining, based on the first synchronization signal, the first correlation detection information for second signals received during the second partial detection range, while temporarily storing the second signals in a second partial buffer among the partial buffers.

According to another example embodiment of the inventive concepts, there is provided an electronic device including a memory including a plurality of partial buffers; and processing circuitry configured to, divide a cell search period into a plurality of partial detection ranges based on a size of the plurality of partial buffers, obtain, based on a first synchronization signal, first correlation detection information for first signals received during a first partial detection range among the plurality of partial detection ranges, while temporarily storing the first signals in a first partial buffer among the partial buffers, obtain, based on the first correlation detection information for the first signals and a second synchronization signal, second correlation detection information for the first signals, during a second partial detection range among the plurality of partial detection ranges, and obtain, based on the first synchronization signal, the first correlation detection information for second signals received during the second partial detection range, while temporarily storing the second signals in a second partial buffer among the partial buffers.

According to another example embodiment of the inventive concepts, there is provided a modem device including an input buffer including a first buffer and a second buffer, the input buffer configured alternately store signals corresponding to a partial detection range in a respective one the first buffer and the second buffer; and processing circuitry configured as a primary sidelink synchronization signal (PSSS) detector to generate PSSS detection information by calculating a PSSS correlation based on the signals stored in the first buffer or the second buffer, a PSSS result manager to determine candidate paths based on the PSSS detection information, a secondary sidelink synchronization signal (SSSS) detector to generate SSSS detection information by calculating a SSSS correlation for the candidate paths, and an SSSS result manager to store the SSSS detection information.

BRIEF DESCRIPTION OF THE DRAWINGS

Example embodiments of the inventive concepts will be more clearly understood from the following detailed description taken in conjunction with the accompanying drawings in which:

FIG. 4B shows a time flow according to cell search;

DETAILED DESCRIPTION

Hereinafter, various example embodiments of the inventive concepts will be described in detail with reference to the accompanying drawings.

Figure 1:
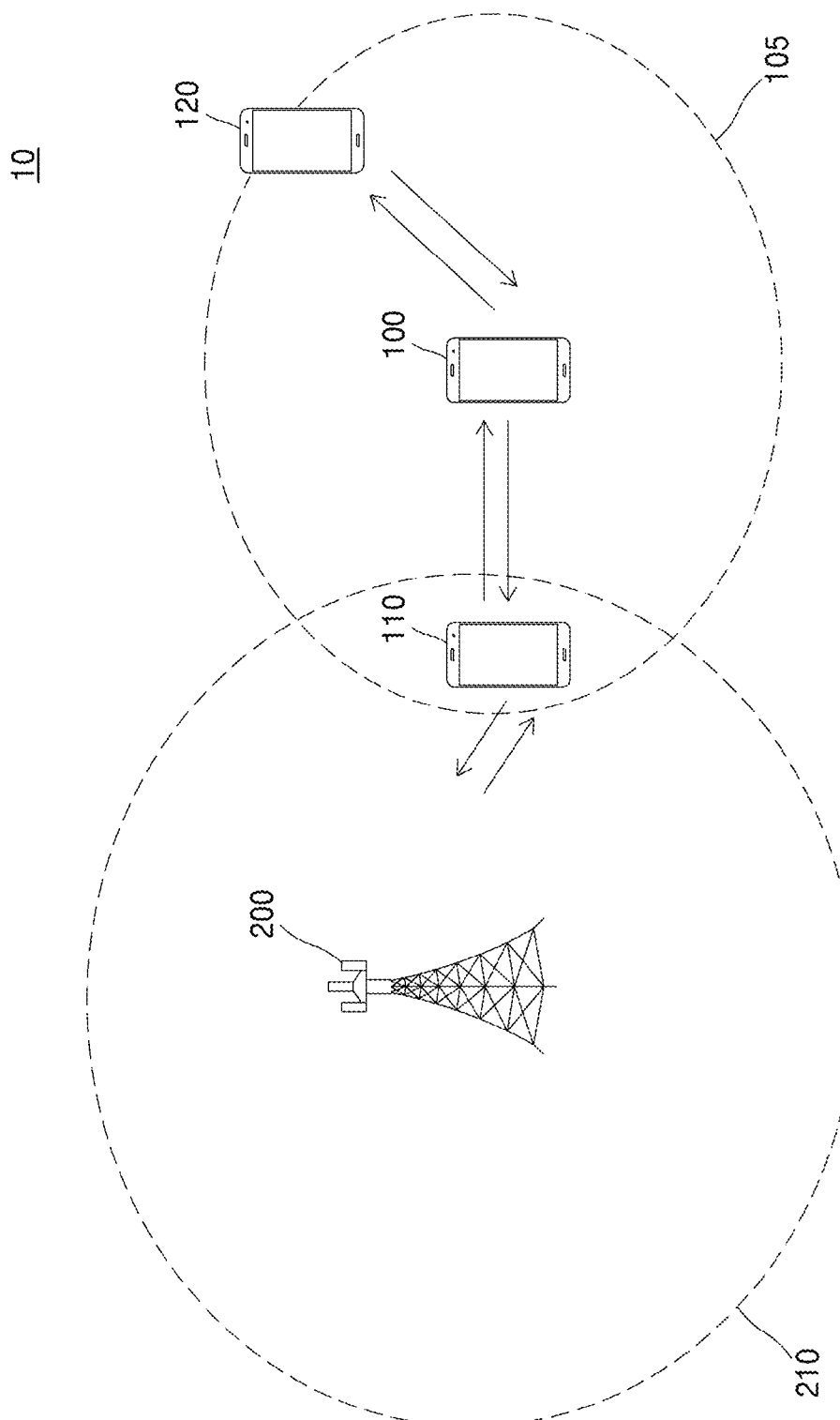
FIG. 1 shows a wireless communication system according to example embodiments of the inventive concepts.

FIG. 1 shows a wireless communication system according to example embodiments of the inventive concepts.

Referring to FIG. 1, a plurality of devices (100, 110, 120) and a base station 200 are disclosed. The plurality of devices 100, 110, and 120 and the base station 200 may be illustrated as nodes using a wireless channel in the wireless communication system. Hereinafter, for convenience of description, an electronic device will be described based on the device 100, and the remaining electronic devices 110 and 120 may be respectively referred to as a first external device 110 and a second external device 120.

According to various example embodiments, the base station 200 may be a network infrastructure that may provide wireless access to the first external device 110. The base station 200 may have coverage 210 to be defined as a constant geographic area based on distance capable of transmitting a signal. The base station 200 may be connected to one or more 'transmission/reception point (TRP)'. The base station 200 may transmit a downlink signal to the first external device 110 arranged inside the coverage 210, or receive an uplink signal therefrom, through one or more TRPs.

According to various example embodiments, the base station 200 may be replaced by other terms including an 'access point (AP)', an 'e node B (eNodeB, eNB)', a '5th generation node (5G node)', a 'wireless point', or other terms with equivalent technical meaning, in addition to the base station.

According to various example embodiments, the electronic device 100, as a device used by user, may be replaced by other terms including an 'user equipment (UE)', a 'mobile station', a 'subscriber station', a 'customer premises equipment (CPE)', a 'remote terminal', a 'wireless terminal', an 'user device', or other terms with equivalent technical meaning, in addition to a terminal.

According to various example embodiments, the electronic device 100 may communicate with the first external device 110 and/or the second external device 120. For example, the communication may correspond to device to device (D2D) communication. For another example, when the electronic device 100 is embedded in a vehicle, the communication may correspond to vehicle to everything (V2X). When the electronic device 100 communicates with the first external device 110 and/or the second external device 120, the first external device 110 and the second external device 120 may arranged inside the coverage of the electronic device 100.

Referring to FIG. 1, the first external device 110 may perform D2D communication with the electronic device 100 in a state in which connection to the base station 200 is established, and the second external device 120 may perform D2D communication with the electronic device 100 even when there is no wireless connection to other devices. The first external device 110 may be referred to as an in-coverage terminal, and the second external device 120 may be referred to as an out-coverage terminal.

According to various example embodiments, the first external device 110 may receive synchronization signals from the base station 200. The synchronization signals may include a primary synchronization signal (PSS) and a secondary synchronization signal (SSS). The PSS and the SSS may correspond to a synchronization signal transmitted from the base station 200 to a terminal (e.g., the first external device 110) inside the coverage 210.

According to various example embodiments, the electronic device 100 may receive sidelink synchronization signals from the first external device 110 or the second external device 120. The sidelink synchronization signals may refer to the synchronization signals for a sidelink communication system. The sidelink synchronization signals may include a primary sidelink synchronization signal (PSSS) and a secondary sidelink synchronization signal (SSSS). That is, since the electronic device 100 is not directly connected to the base station 200, D2D communication or V2X communication may be performed with peripheral terminals (e.g., the first external device 110 or the second external device 120). Hereinafter, PSSS and SSSS will be described with reference to FIG. 2.

Figure 2A:
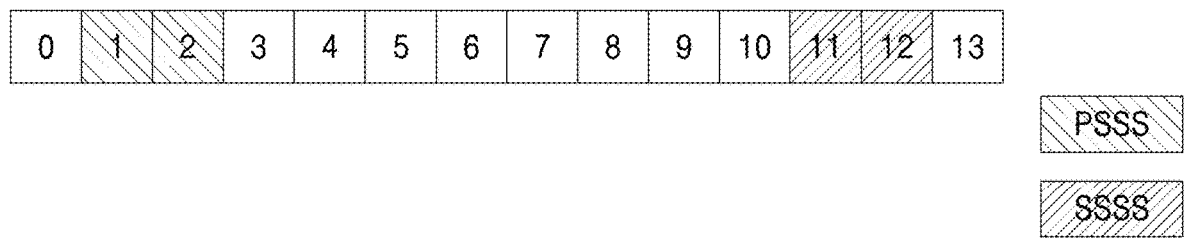
FIGS. 2A and 2B show examples of synchronization signals in a sidelink system according to example embodiments of the inventive concepts.
Figure 2B:
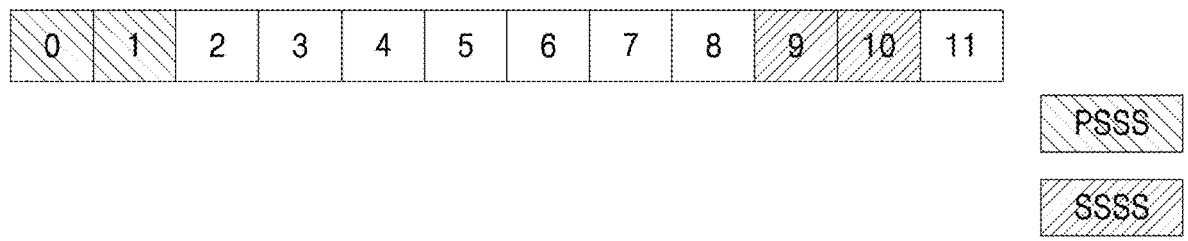

FIGS. 2A and 2B show examples of a sidelink synchronization signal.

FIG. 2A shows resource mapping of PSSS and SSSS in a normal cyclic prefix (CP), and FIG. 2B shows resource mapping of PSSS and SSSS in an extended CP. CP may refer to a guard interval to be inserted between a symbol and a symbol in order to reduce inter-symbol interference.

Referring to FIG. 2A, one subframe to be transmitted based on the normal CP may include 14 symbols. PSSS of the sidelink synchronization signals may be assigned to symbols 1 and 2. SSSS of the sidelink synchronization signals may be assigned to symbols 11 and 12.

Referring to FIG. 2B, one subframe to be transmitted based on the extended CP may include 12 symbols. In the case of the extended CP, a length of one CP of the extended CP may be longer than that of the normal CP. PSSS of the sidelink synchronization signals may be allocated to symbols 0 and 1. SSSS of the sidelink synchronization signals may be allocated to symbols 9 and 10.

Figure 3:
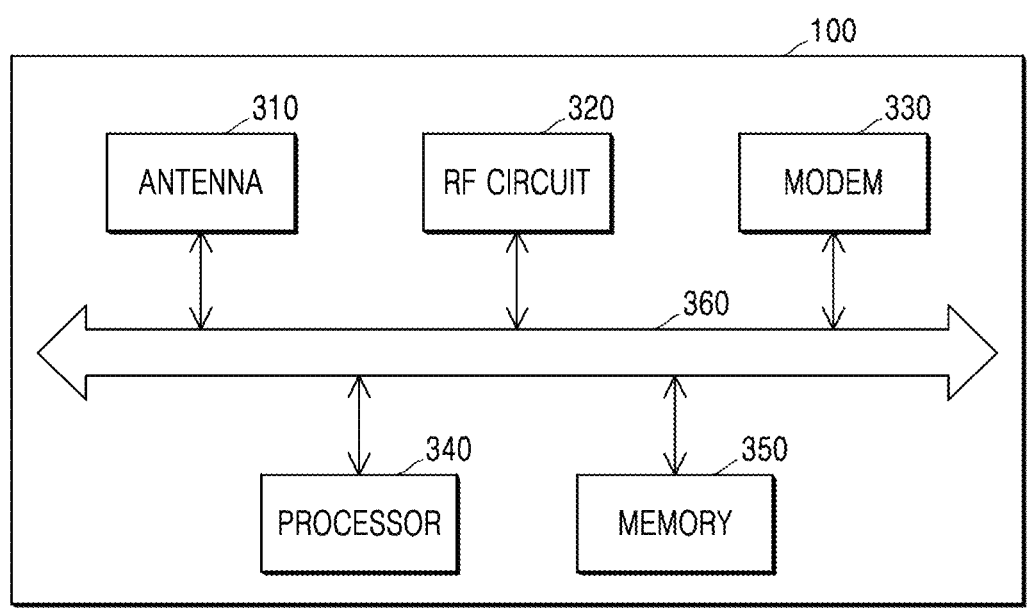
FIG. 3 is a block diagram of an electronic device according to example embodiments of the inventive concepts.

FIG. 3 is a block diagram of an electronic device according to example embodiments of the inventive concepts.

Referring to FIG. 3, the electronic device 100 may include an antenna 310, an RF (radio frequency) circuit 320, a modem 330, a processor 340, a memory 350, and a system interconnect 360.

According to various example embodiments, each of components included in the electronic device 100 may be a hardware block including an analog circuit and/or a digital circuit, and may be implemented by a processor executing software including a plurality of instructions that transform the processor into a special purpose processor to perform the functions of the components.

The RF circuit 320 may receive a wireless signal to be transmitted by the base station 200 through the antenna 310. For example, the RF circuit 320 may move the wireless signal that is in a frequency band of high center frequency, to a base band and output it to the modem 330. In other words, the RF circuit 320 may demodulate the received wireless signal to be enabled signal processing in the modem 330, the processor 340, or the memory 350. In addition, the RF circuit 320 may receive data or the like from the modem 330, modulate them, and transmit them to the base station 200 through the antenna 310.

The processor 340 may include an intelligent hardware device such as a central processing unit (CPU), a microcontroller, an application processor, or a graphics processing unit (GPU).

For example, the processor 340 may be implemented in processing circuitry such as hardware including logic circuits; a hardware/software combination such as a processor executing software; or a combination thereof and memory. For example, the processing circuitry more specifically may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc. The processing circuitry may be special purpose processing circuitry that may reduce the cell search time by performing SSSS detection for the first partial detection range in parallel with PSSS detection for the second partial detection range and may reduce system load by avoiding redundant calculations on candidate paths through bypassing SSSS detection for candidate paths where an indicator indicates that the SSSS correlation result value already exists.

The memory 350 may store software code that is computer readable and/or computer executable and includes a plurality of instructions. According to an example embodiment, the memory 350 may store a plurality of signal processing algorithms for signal processing of wireless communication.

The memory 350 may include, for example, a volatile memory device such as dynamic random access memory (DRAM) or synchronous dynamic random access memory (SDRAM). In addition, the memory 350 may include, for example, a non-volatile memory device such as electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), or ferroelectric random access memory (FRAM).

The system interconnect 360 may be implemented as a bus to which a protocol having a predetermined standard bus specification is applied. For example, as the standard bus specification, an advanced microcontroller bus architecture (AMBA) protocol from ARM (Advanced RISC Machine) may be applied. The bus types of the AMBA protocol may include advanced high-performance bus (AHB), advanced peripheral bus (APB), advanced eXtensible interface (AXI), AXI4, and AXI coherency extensions (ACE), and the like.

Figure 4A:
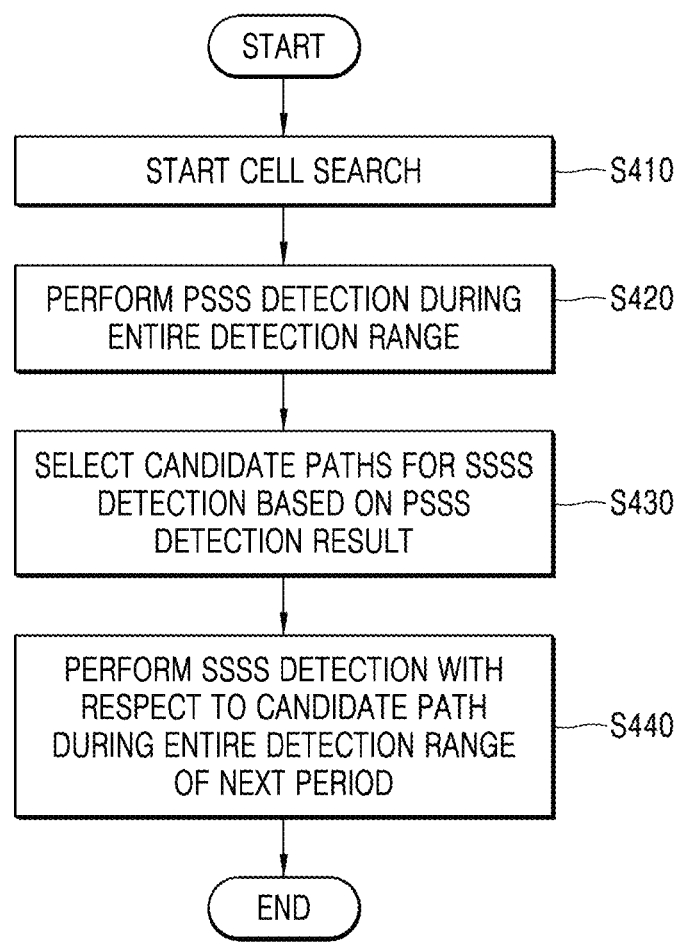
FIG. 4A shows an operation sequence for performing cell search.

FIG. 4A shows an operation sequence for performing cell search, and FIG. 4B shows a time flow according to the cell search.

Referring to FIG. 4A, in operation S410, the electronic device 100 may start the cell search. During the cell search, the electronic device 100 may detect a signal broadcast from any device inside the coverage of the electronic device 100.

In operation S420, the electronic device 100 may detect PSSS during an entire detection range. According to various example embodiments, a length of the entire detection range may be various. For example, in the case of the electronic device 100 performing D2D communication among the sidelink communication systems, the length of the entire detection range may correspond to 40 ms. For another example, when the electronic device 100 performs V2X communication, the length of the entire detection range may correspond to 160 ms. That is, the electronic device 100 may receive the signal broadcast from external devices (for example, the first external device 110 or the second external device 120 in FIG. 1) arranged around the electronic device 100 for 40 ms or 160 ms. Referring to FIG. 4B, the entire detection range may correspond to a PSSS detection range ($t_P$).

In operation S430, the electronic device 100 may select candidate paths for SSSS detection based on PSSS detection result. For example, the electronic device 100 may receive signals during the entire detection range, calculate correlation values between respective ones of the received signals and the PSSS signal, and identify time positions with respect to top N signals having the high correlation value by, for example, sorting the correlation values in descending order. Each of the identified N signals may correspond to the candidate path. Here, the candidate path may refer to signals for which SSSS is determined to be highly likely to be detected. For example, referring to FIG. 4B, the electronic device 100 may calculate the correlation values between the PSSS signal and signals received during the PSSS detection range, and may select signals corresponding to the top four largest correlation values. The time positions for the four candidate paths may correspond to times t=a, t=b, t=c, and t=d, respectively.

In operation S440, the electronic device 100 may perform SSSS detection for candidate paths during the entire detection range of a next period. For example, the electronic device 100 may perform the calculation of the correlation value 168 times for each of secondary identification (SID) at a time corresponding to time t=a when SSSS may be expected to exist, that is, at time t=a+$t_P$ among the entire detection range of the next period. The remaining times b, c, and d may be described in the same way.

Time to be required for SSSS detection, that is, SSSS detection range ($t_S$) may be determined based on the time positions of the identified candidate paths. Here, since the candidate paths to be identified and the time positions corresponding to the identified candidate paths are also variable, the lengths of the SSSS detection range and the cell detection range may be variable. Here, the cell detection range ($t_{CS}$) may refer to a period in which PSSS and SSSS detections are completed, and may be understood as a sum of time lengths of PSSS detection range ($t_P$) and SSSS detection range ($t_S$).

For example, referring to FIG. 4B, when candidate paths having a high PSSS correlation value are arranged in front of the entire detection range (or PSSS detection range (tP)) (for example, when all candidate paths are arranged before time t=a), the length of the cell detection range ($t_{CS}$) to be required for PSSS and SSSS detections may be the PSSS detection range ($t_P$) and a first SSSS detection range ($t_{S\_1}$).

For another example, when candidate paths having the high PSSS correlation value among sidelink synchronization signals of D2D communication are arranged in the back of the entire detection range (for example, when all candidate paths are arranged before time t=d), the cell detection range ($t_{CS}$) may be the PSSS detection range ($t_P$)+a fourth SSSS detection range ($t_{S\_4}$).

Referring to FIG. 4B, for example, when the last time position corresponding to one candidate path from among candidate paths is time t=d, it may be confirmed that the length of the fourth SSSS detection range ($t_{S\_4}$) is fairly equivalent to the length of the PSSS detection range ($t_P$). That is, the length of the cell detection range ($t_{CS}$) may correspond to twice the entire detection range (or PSSS detection range ($t_P$)). This is because SSSS correlation must be calculated for each of 168 SIDs with respect to the SSSS to be received at the time that corresponds to the time positions of the candidate paths in the PSSS detection range ($t_P$) of the next period, by identifying only the time positions for candidate paths having the high PSSS correlation value during the PSSS detection range ($t_P$).

Figure 5:
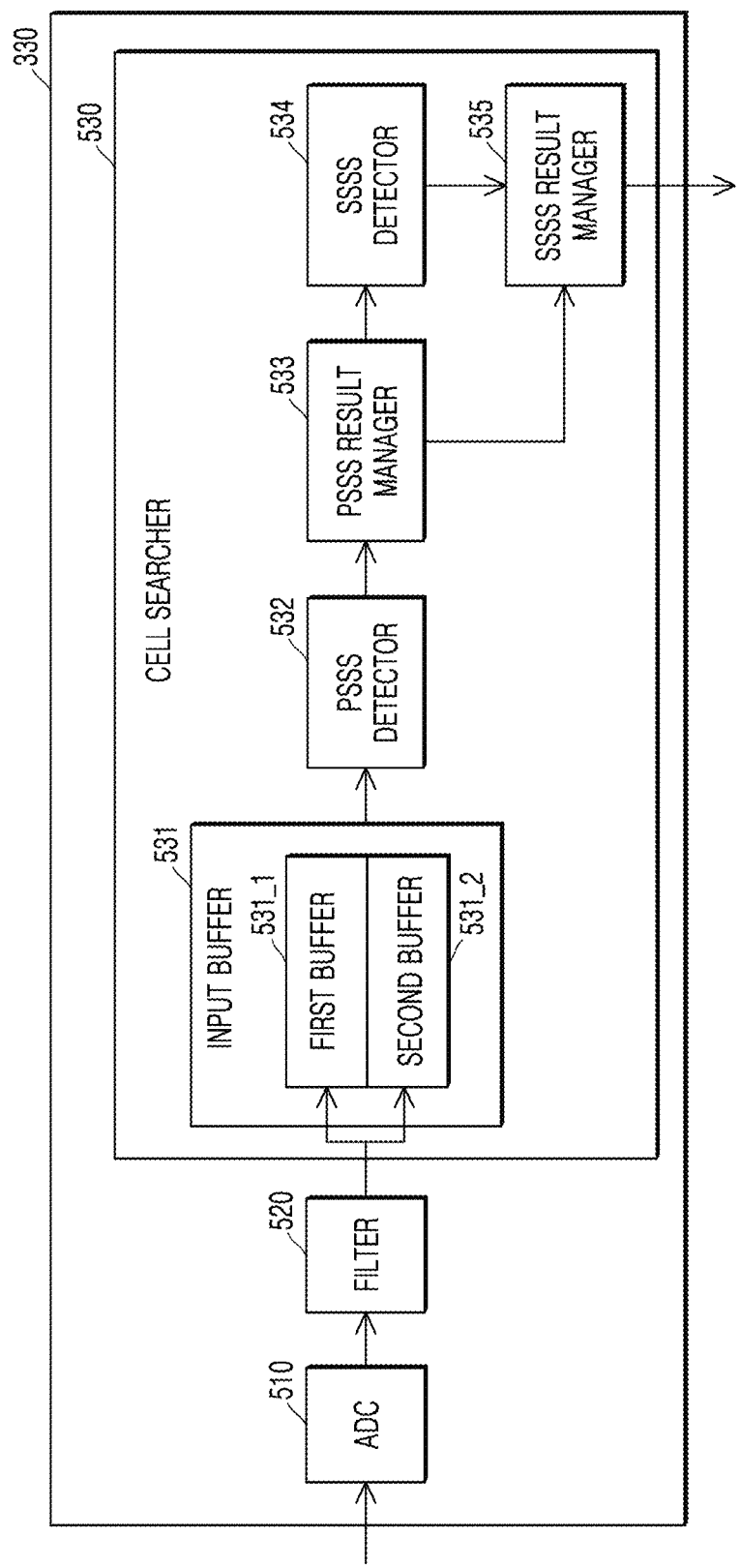
FIG. 5 is a block diagram of a modem according to example embodiments of the inventive concepts.

FIG. 5 is a block diagram of a modem according to example embodiments of the inventive concepts.

FIGS. 3 and 5, the modem 330 may include an analog to digital converter (ADC) 510, a filter 520 and a cell searcher 530.

For example, the modem 330 or the processor 340 may include processing circuitry such as hardware including logic circuits; a hardware/software combination such as a processor executing software; or a combination thereof and memory. For example, the processing circuitry more specifically may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc. The processing circuitry may be special purpose processing circuitry that performs the functions of the analog to digital converter (ADC) 510, the filter 520 and the cell searcher 530, and the sub-components thereof.

According to various example embodiments, the ADC 510 may digitally convert the received wireless signal, and the filter 520 may filter signal corresponding to the frequency band of the synchronization signal from the digitally converted wireless signal.

According to various example embodiments, the cell searcher 530 may include an input buffer 531, a PSSS detector 532, a PSSS result manager 533, an SSSS detector 534, and an SSSS result manager 535.

For example, the special purpose processing circuitry of the model 330 may be configured to perform the functions of the input buffer 531, the PSSS detector 532, the PSSS result manager 533, the SSSS detector 534, and the SSSS result manager 535 such that the processing circuitry reduces the cell search time by performing SSSS detection for the first partial detection range in parallel with PSSS detection for the second partial detection range and may reduce system load by avoiding redundant calculations on candidate paths through bypassing SSSS detection for candidate paths where an indicator indicates that the SSSS correlation result value already exists.

The input buffer 531 may temporarily store data for the wireless signals. The input buffer 531 according to various example embodiments of the inventive concepts may include at least two or more buffers. For example, referring to FIG. 5, the input buffer 531 may include a first partial buffer 531_1 and a second partial buffer 531_2. The first partial buffer 531_1 and the second partial buffer 531_2 may be referred to as an odd buffer and an even buffer, respectively. In FIG. 5, the input buffer 531 is illustrated as including two buffers, but is not limited thereto. According to various example embodiments, the input buffer 531 may include three or more buffers.

According to various example embodiments, the first partial buffer 531_1 and the second partial buffer 531_2 may alternately temporarily store signals with respect to the partial detection range. For example, when the entire detection range is divided into N partial detection ranges, the first partial buffer 531_1 or the odd buffer may temporarily store signals to be received during odd-numbered partial detection ranges among the N partial detection ranges. The second partial buffer 531_2 or the even buffer may temporarily store signals to be received during even-numbered partial detection ranges among the N partial detection ranges.

The input buffer 531 may process PSSS detection and SSSS detection in parallel by alternately receiving signals through at least two or more buffers. A detailed description thereof will be described later with reference to FIGS. 6 to 9.

Figure 6:
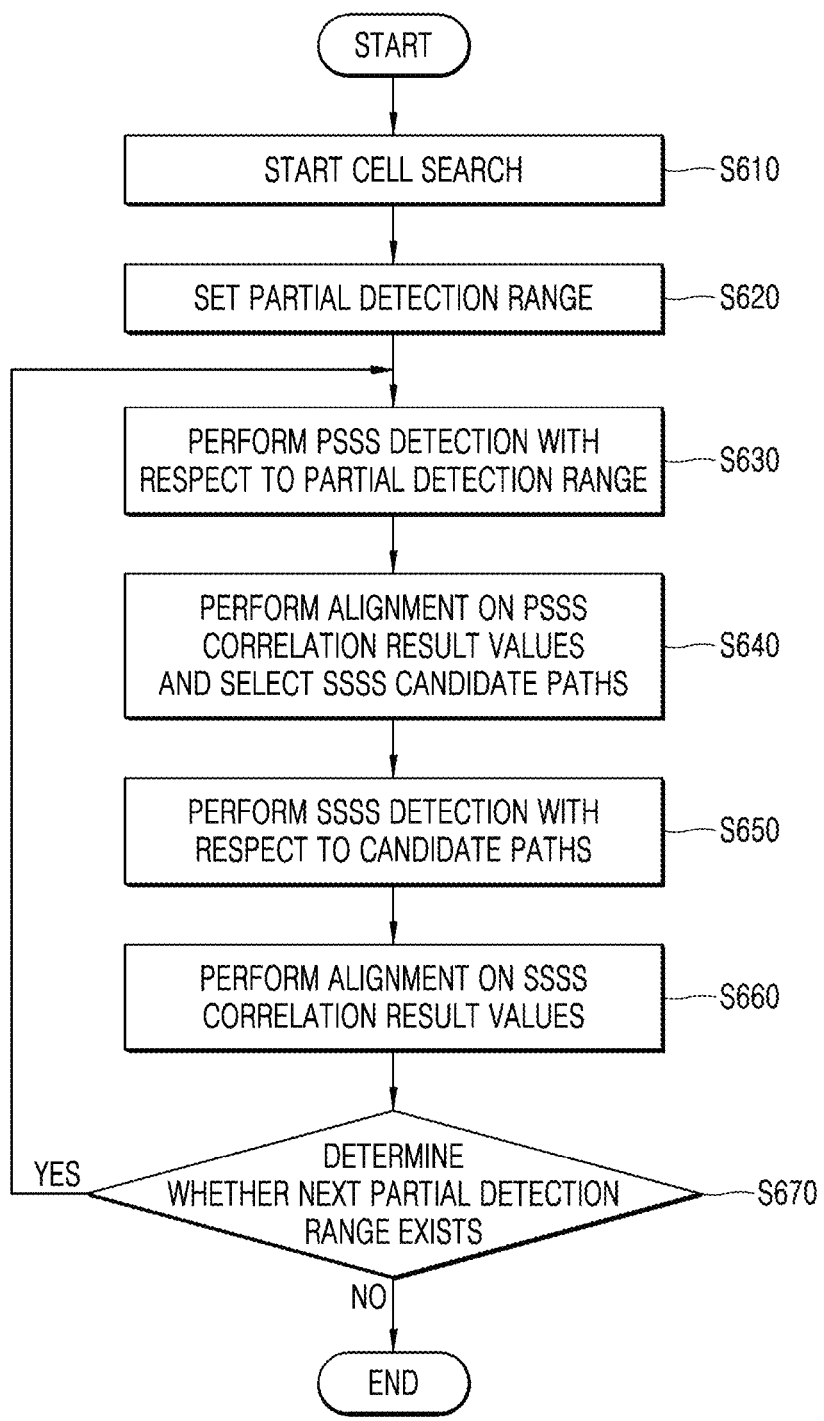
FIG. 6 is a flow chart for performing cell search according to an example embodiment of the inventive concepts.

FIG. 6 is a flow chart for performing cell search according to an example embodiment of the inventive concepts.

Referring to FIG. 6, in operation S610, the cell searcher 530 may start the cell search. The description of operation S610 is redundant with operation S410 of FIG. 4A and will be omitted.

In operation S620, the cell searcher 530 may set a partial detection range. Setting the partial detection range may refer to dividing the entire detection range into a plurality of ranges.

According to various example embodiments, the length of the partial detection range may be determined based on buffer size of the input buffer 531 and type of communication system.

According to an example embodiment, the buffer size of the input buffer 531 may be proportional to the length of the partial detection range. For example, when the buffer size of the input buffer 531 is large enough to store all signals to be received during the entire detection range, the electronic device 100 may bypass the dividing into the partial detection range. For another example, when the buffer size of the input buffer 531 is small, the electronic device 100 may divide the entire detection range into a plurality of partial detection ranges, and alternately receive and store signals by using at least two or more buffers.

In operation S630, the PSSS detector 532 may perform PSSS detection with respect to the partial detection range. Here, the PSSS detection may refer to calculating the correlation value between the received signal and the PSSS signal. According to various example embodiments, the PSSS detector 532 may be referred to as a first correlation detector. As described above, assuming that the entire detection range is divided into four partial detection ranges, signals received during the first partial detection range may be stored in the first partial buffer 531_1. The PSSS detector 532 may perform PSSS correlation calculation in real time on signals to be sequentially stored in the first partial buffer 531_1 during the first partial detection range. That is, signals received during the first partial detection range may be stored in the first partial buffer 531_1 and at the same time, may be processed by correlation calculation with the PSSS signal. The PSSS detector 532 may transmit the obtained PSSS correlation calculation value to the PSSS result manager 533.

In operation S640, the PSSS result manager 533 may perform alignment on the PSSS correlation result values and select candidate paths. The PSSS result manager 533 may also be referred to as a first correlation result manager. The candidate paths may be signals having a large PSSS correlation result value and may refer to signals having high probability of detecting SSSS. The PSSS result manager 533 may receive the PSSS correlation result values for signals received during the first partial detection range in real time, and may sort the correlation result values in real time in descending order. In addition, the PSSS result manager 533 may store only a desired (or, alternatively, a predefined) number of the PSSS correlation result values having a relatively a high value while receiving in real time the PSSS correlation result values for signals received during the first partial detection range. For example, when the PSSS correlation result value to be received in real time is smaller than a desired (or, alternatively, a predefined) number of PSSS correlation result values, the PSSS result manager 533 may drop the newly received PSSS correlation result value. The PSSS result manager 533 may update the desired (or, alternatively, the predefined) number of result values as candidate paths according to high value order among the plurality of the PSSS correlation result values. The predefined number may be expressed as N_PSSS_TOT. For example, the PSSS result manager 533 may determine the N_PSSS_TOT signals among the PSSS result values for signals to be received during the partial detection range as the candidate path.

In operation S650, the SSSS detector 534 may perform SSSS detection with respect to candidate paths. Here, SSSS detection may refer to performing correlation calculation for each of 168 SIDs with respect to each of the candidate paths (for example, a signal having a high PSSS correlation result value). The SSSS detector 534 may also be referred to as a second correlation detector. Referring to operation S640, the PSSS result manager 533 may transmit information on the N_PSSS_TOT candidate paths to the SSSS result manager 535 and the SSSS detector 534. The SSSS detector 534 may calculate a plurality of SSSS correlation result values based on 168 SIDs for each of the N_PSSS_TOT PSSSs.

In operation S660, the SSSS result manager 535 may perform alignment on the SSSS correlation result values. The SSSS result manager 535 may also be referred to as a second correlation result manager. The SSSS detector 534 may perform calculation for N_PSSS_TOT*168 SSSS correlation result values and may sort them in descending order according to the order of highest SSSS correlation result values. The SSSS result manager 535 may update a predefined number of result values among the plurality of SSSS correlation result values.

In operation S670, the cell searcher 530 may determine whether a next partial detection range exists. When the next partial detection range exists, PSSS and SSSS detections for the corresponding range may be performed, and when the next partial detection range does not exist, it may be determined that PSSS and SSSS detections with respect to the entire detection range are completed. According to an example embodiment, the cell searcher 530 may further include a timer (not shown). The timer (not shown) may count during the period of the entire detection range (or PSSS detection range) according to the type of sidelink communication system. The timer (not shown) may generate a control signal instructing to stop the cell search of the cell searcher 530 when the entire detection range has elapsed. Thereafter, in some example embodiments, the device 100 may synchronize with the device 110 using the results of the cell search, for example, the PSSS and SSSS signals.

Figure 7:
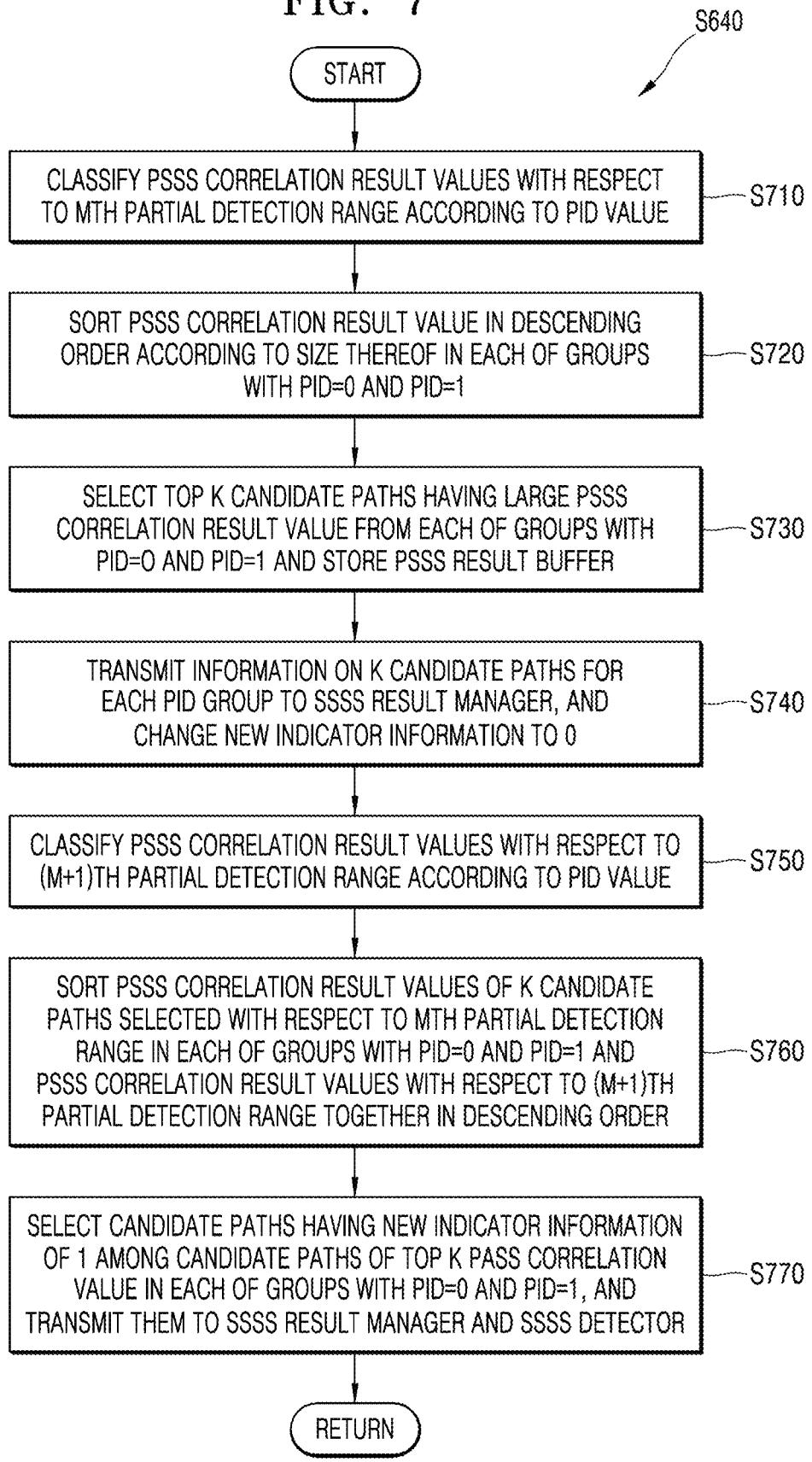
FIG. 7 shows an operation sequence of a PSSS manager according to an example embodiment of the inventive concepts.

FIG. 7 shows an operation sequence of a PSSS manager according to an example embodiment of the inventive concepts.

FIG. 7 is a detailed embodiment of the operation sequence of the PSSS result manager 533 that performs sorting on the PSSS correlation result values of FIG. 6 and performs operation S640 for selecting candidate paths.

Referring to FIG. 7, in operation 710, the PSSS result manager 533 may classify PSSS correlation result values with respect to the Mth partial detection range according to physical identification (PID) value. The PID value may correspond to a value for indicating either the in-coverage or the out-coverage of the external device that has transmitted the signal. For example, since the first external device 110 of FIG. 1 is connected to the base station 200, the first external device 110 may be an in-coverage external device, and the PID value of the signal transmitted by the first external device 110 may be 0. For another example, since the second external device 120 of FIG. 1 is not connected to the base station 200, the second external device 120 may be an out-coverage external device, and the PID value of the signal transmitted by the second external device 120 may be 1. The PSSS result manager 533 may distinguish the PSSS correlation result values into a group of PID=1 and a group of PID=0.

In operation S720, the PSSS result manager 533 may sort the PSSS correlation result values in descending order according to the size of the PSSS correlation result values in each of the groups with PID=0 and PID=1. The number of PSSS correlation result values sorted in descending order may be a desired (or, alternatively, a predefined) number. If the descending order according to the PID value is shown, it may be as shown in Table 1 below.

TABLE 1

|  | PSSS correlation value | Remark |
| --- | --- | --- |
| PSSS #1_28 | 0.81 | PID = 0 |
| PSSS #1_2 | 0.78 | PID = 0 |
| PSSS #2_5 | 0.71 | PID = 0 |
| PSSS #3_41 | 0.69 | PID = 0 |
| PSSS #4_98 | 0.61 | PID = 0 |
| PSSS #2_50 | 0.58 | PID = 0 |
| PSSS #M_13 | 0.40 | PID = 0 |
| PSSS #M_93 | 0.35 | PID = 0 |
| PSSS #M_4 | 0.33 | PID = 0 |
| PSSS #M_2 | 0.32 | PID = 0 |
| . | . | . |
| PSSS #2_8 | 0.90 | PID = 1 |
| PSSS #2_13 | 0.87 | PID = 1 |
| PSSS #3_48 | 0.81 | PID = 1 |
| PSSS #5_10 | 0.75 | PID = 1 |
| PSSS #1_87 | 0.70 | PID = 1 |
| PSSS #1_30 | 0.64 | PID = 1 |
| PSSS #M_45 | 0.61 | PID = 1 |
| PSSS #M_70 | 0.53 | PID = 1 |
| PSSS #M_1 | 0.48 | PID = 1 |
| PSSS #M_3 | 0.47 | PID = 1 |
| . | . | . |

In PSSS #A_B shown in Table 1, A may be a value indicating whether the PSSS is signal received during an Ath partial detection range, and B may be a value indicating how many times the PSSS has been received among signals received from the Ath partial detection range.

In operation S730, the top K signals having a large PSSS correlation result value may be selected from each of the group with PID=0 and the group with PID=1 as candidate paths, and information with respect to the candidate paths may be stored in a PSSS result buffer (not shown). Here, K may correspond to ½ of N_PSSS_TOT. Table 2 shows selected candidate paths.

TABLE 2

|  | PSSS correlation value | Remark |
| --- | --- | --- |
| PSSS #1_28 | 0.81 | PID = 0 |
| PSSS #1_2 | 0.78 | PID = 0 |
| PSSS #2_5 | 0.71 | PID = 0 |
| PSSS #3_41 | 0.69 | PID = 0 |
| PSSS #4_98 | 0.61 | PID = 0 |
| PSSS #2_50 | 0.58 | PID = 0 |
| PSSS #M_13 | 0.40 | PID = 0 |
| PSSS #M_93 | 0.35 | PID = 0 |
| PSSS #M_4 | 0.33 | PID = 0 |
| PSSS #2_8 | 0.90 | PID = 1 |
| PSSS #2_13 | 0.87 | PID = 1 |
| PSSS #3_48 | 0.81 | PID = 1 |
| PSSS #5_10 | 0.75 | PID = 1 |
| PSSS #1_87 | 0.70 | PID = 1 |
| PSSS #1_30 | 0.64 | PID = 1 |
| PSSS #M_45 | 0.61 | PID = 1 |
| PSSS #M_70 | 0.53 | PID = 1 |
| PSSS #M_1 | 0.48 | PID = 1 |

In operation S740, information on K candidate paths for each PID group may be transmitted to the SSSS result manager 535, and new indicator information may be changed. The new indicator information may be information for indicating that an arbitrary signal is first included in the candidate path of each PID group. A detailed description of the new indicator information will be described later in operation S760.

In operation S750, the PSSS result manager 533 may classify the PSSS correlation result values with respect to (M+1)th partial detection range according to PID values. The (M+1)th partial detection range may refer to a partial detection range subsequent to the Mth partial detection range among the entire detection ranges. The description of classifying the PSSS correlation values according to the PID values is redundant with operation S710, and will be omitted. Here, referring to FIG. 5, if signals to be received during the Mth partial detection range are stored in the first partial buffer 531_1, and signals to be received during the (M+1)th partial detection range may be stored in the second partial buffer 531_2.

In operation S760, the PSSS result manager 533, in each of the groups with PID=0 and PID=1, may sort PSSS correlation result values of K candidate paths selected with respect to the Mth partial detection range and PSSS correlation result values of (M+1)th partial detection range in descending order together in real time. That is, the PSSS result manager 533 may compare together the top K PSSS correlation result values among the signals of all partial detection ranges before the (M+1)th partial detection range and the PSSS correlation result value of signals received during the (M+1)th partial detection range. Accordingly, the PSSS result manager 533 may obtain the same result as the descending order of K candidate paths showing high correlation with the PSSS signal among all signals received from a first partial detection range to an arbitrary partial detection range.

According to an example embodiment, by comparing top K PSSS correlation values with respect to the Mth partial detection range to the PSSS correlation result values with respect to signals received during the (M+1)th partial detection range in real time, signals having top K PSSS correlation values may be updated as candidate paths.

For example, PSSS correlation result values for signals received during the (M+1)th partial detection range may be smaller than top K PSSS correlation result values for the Mth partial detection range. Since the signals having the top K PSSS correlation values are not changed, candidate paths may not be updated.

As another example, P PSSS correlation result values among PSSS correlation result values for signals received during the (M+1)th partial detection range may be arranged between the top K PSSS correlation result values with respect to the Mth partial detection range. For example, when P signals among the top K signals in the PID=0 group are changed may be shown as follows.

TABLE 3

| | PSSS correlation value | Remark | | |
|---|---|---|---|---|
| PSSS #1_28 | 0.81 | PID = 0 | New indicator = 0 |
| PSSS #1_2 | 0.78 | PID = 0 | New indicator = 0 |
| PSSS #2_5 | 0.71 | PID = 0 | New indicator = 0 |
| PSSS #3_41 | 0.69 | PID = 0 | New indicator = 0 |
| PSSS #M + 1_3 | 0.67 | PID = 0 | New indicator = 1 |
| PSSS #M + 1_1 | 0.64 | PID = 0 | New indicator = 1 |
| PSSS #4_98 | 0.61 | PID = 0 | New indicator = 0 |
| PSSS #2_50 | 0.58 | PID = 0 | New indicator = 0 |
| PSSS #M + 1_13 | 0.45 | PID = 0 | New indicator = 1 |

Referring to Table 3, it may be seen that PSSS #M+1_3, PSSS #M+1_1, and PSSS #M+1_13 are newly added as candidate paths. Table 3 shows only sorting in descending order for the group with PID=0, but is not limited thereto. It may be clearly understood that the group with PID=1 is sorted in descending order.

In operation S770, candidate paths having new indicator information of 1 may be selected from each of the candidate paths of the group with PID=0 and the group with PID=1, and information on the selected candidate paths may be stored in the PSSS result buffer.

Referring to Table 3, it may be seen that new indicator values of newly added PSSS #M+1_3, PSSS #M+1_1, and PSSS #M+1_13 are 1. That is, since the three signals have been selected as candidate paths in the previous partial detection range and have never calculated the SSSS correlation result value, the new indicator value may be 1. Since information on signals with a new indicator value of 0 has previously transmitted to the SSSS result manager 535 and the SSSS detector 534, the PSSS result manager 533 may provide information on candidate paths with the new indicator value of 1 to SSSS result manager 535 and SSSS detector 534.

Figure 8:
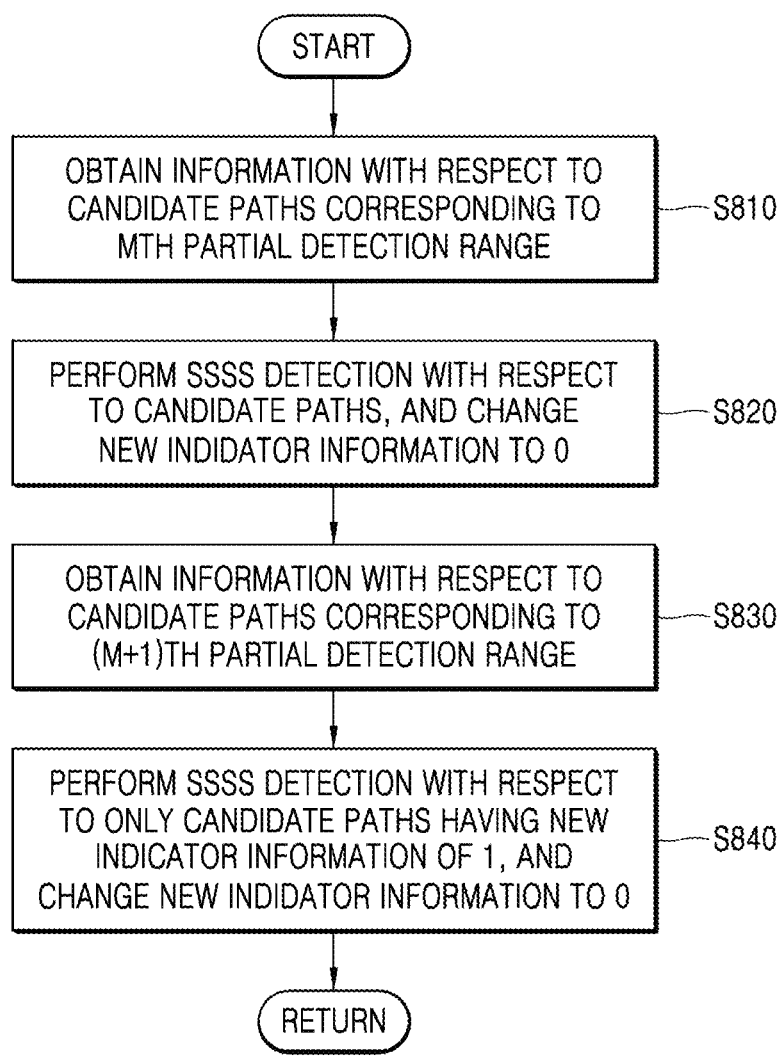
FIG. 8 shows an operation sequence of a SSSS manager according to an example embodiment of the inventive concepts.

FIG. 8 shows an operation sequence of a SSSS manager according to an example embodiment of the inventive concepts.

FIG. 8 illustrates an operation sequence of the SSSS detector 534 performing operation S650 of performing SSSS detection for the candidate paths of FIG. 6.

Referring to FIG. 8, in operation S810, the SSSS detector 534 may obtain information with respect to candidate paths corresponding to the Mth partial detection range. Referring to operation S740 of FIG. 7, the SSSS detector 534 may receive information with respect to K candidate paths for each PID group from the PSSS result manager 533.

In operation S820, the SSSS detector 534 may perform SSSS detection with respect to candidate paths and change new indicator information for the candidate paths into 0.

According to an example embodiment, when M=1, all candidate paths received by the SSSS detector 534 may have new indicator information of 1, and the SSSS correlation value may not exist. In this case, the SSSS detector 534 may perform SSSS detection for each of the K candidate paths to obtain the SSSS correlation result value and change the new indicator information into 0. That is, by changing the new indicator information into 0, it may be possible to indicate whether SSSS detection has been previously performed for each candidate path. The SSSS detector 534 may transmit the SSSS correlation result value to the SSSS result manager 535.

In operation S830, the SSSS detector 534 may obtain information of candidate paths corresponding to the (M+1)th partial detection range. Information of candidate paths corresponding to the (M+1)th partial detection range may correspond to information received from the PSSS result manager 533 in operation S770.

According to an example embodiment, candidate paths corresponding to the (M+1)th partial detection range may be the same as candidate paths corresponding to the Mth partial detection range, and when the signal newly added to candidate path exists among signals of the (M+1)th partial detection range, at least some candidate paths corresponding to the (M+1)th partial detection range may be different from candidate paths corresponding to the Mth partial detection range.

In operation S840, the SSSS detector 534 may perform SSSS detection only with respect to candidate paths for which the new indicator information is 1, and change new indicator information for candidate paths for which the SSSS detection is performed, into 0.

According to an example embodiment, the SSSS detector 534 may not perform SSSS detection for a candidate path where a new indicator information value is 0 because it is included in an existing candidate path among the top K candidate paths. The SSSS detector 534 may perform SSSS detection only for the candidate path where a new indicator information value is 1 because it is newly incorporated into the candidate paths among the top K candidate paths. That is, by bypassing SSSS detection for candidate paths where the SSSS correlation result value already exists, the number of SSSS detections for the entire detection range may be reduced while reducing a system load of the cell searcher 530.

Figure 9:
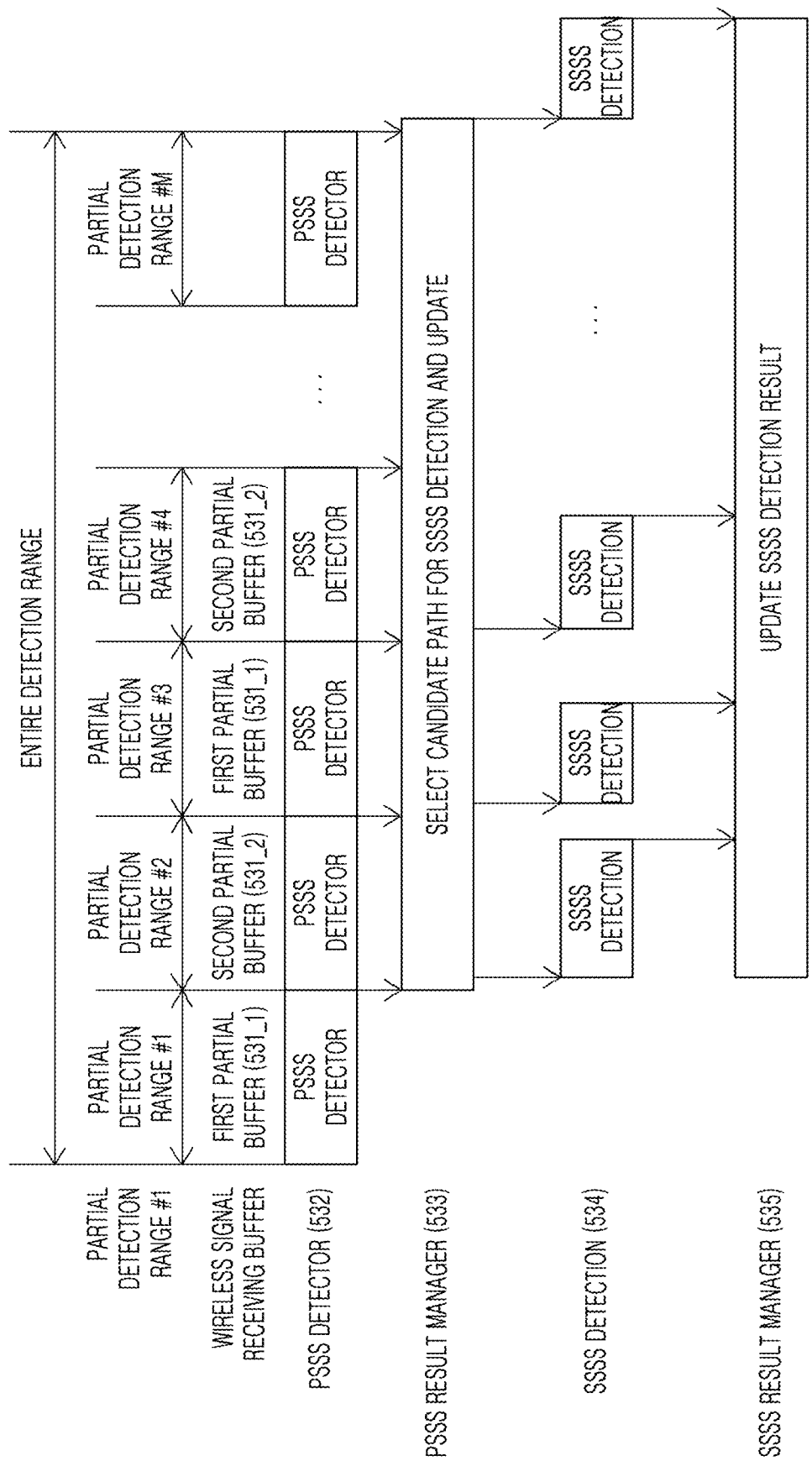
FIG. 9 shows a time flow of cell search according to an example embodiment of the inventive concepts.

FIG. 9 shows a time flow of cell search according to an example embodiment of the inventive concepts. Descriptions overlapping FIGS. 6 to 8 will be omitted.

Referring to FIG. 9, signals received during partial detection range #1 may be temporarily stored in a first partial buffer 531_1, and at the same time, the PSSS detector 532 may perform PSSS detection with respect to signals to be received to the first partial buffer 531_1 in real time. Hereinafter, signals to be received during the partial detection range #1 will be referred to as first signals.

The PSSS detector 532 may complete PSSS detection for the partial detection range #1 and transmit PSSS correlation result values for the first signals to the PSSS result manager 533 in real time.

The PSSS result manager 533 may sort the PSSS correlation result values to be received from the PSSS detector 532 in descending order in real time and select any number of candidate paths having a high value in real time. The PSSS result manager 533 may transmit information of candidate paths for the partial detection range #1 to the SSSS detector 534 and the SSSS result manager 535 at the end time of the partial detection range #1.

Signals received during the partial detection range #2 may be temporarily stored in the second partial buffer 531_2, and at the same time, the PSSS detector 532 may detect PSSS for signals to be received to the second partial buffer 531_2 in real time. Hereinafter, signals to be received during the partial detection range #2 will be referred to as second signals.

That is, PSSS detection for the second signals may be performed during the partial detection range #2, and at the same time, SSSS detection for the candidate paths selected among the first signals in the partial detection range #1 may be simultaneously performed in parallel. Descriptions of the partial detection range #3 to the partial detection range #M are redundant and will be omitted.

The SSSS result manager 535 may complete the update of the SSSS detection result only by performing one SSSS detection from the time when the entire detection range ends. That is, the time to be required for PSSS and SSSS detections with respect to the entire detection range may be greatly reduced at up to twice the total detection range.

Referring to FIGS. 1 to 9, the electronic device according to various example embodiments of the inventive concepts are described based on PSSS and SSSS detection, but is not limited thereto. It will be apparent to those skilled in the art that it may be applied to PSS and SSS detection of LTE communication systems and 5th generation (5G) communication systems according to various example embodiments.

Figure 10:
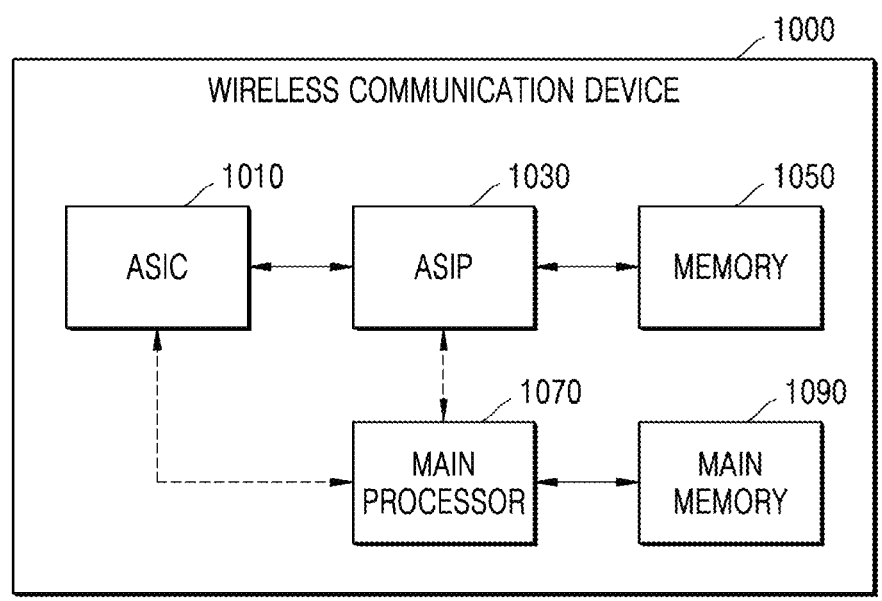
FIG. 10 is another block diagram showing an electronic device according to an example embodiment of the inventive concepts.

FIG. 10 is another block diagram showing an electronic device according to an example embodiment of the inventive concepts.

Referring to FIG. 10, as an example of the electronic device, a wireless communication device 1100 may include an application specific integrated circuit (ASIC) 1110, an application specific instruction set processor (ASIP) 1130, a memory 1150, a main processor 1170, and a main memory 1190. Two or more of the ASIC 1110, ASIP 1130, and main processor 1170 may communicate with each other.

In addition, at least two or more of the ASIC 1110, the ASIP 1130, the memory 1150, the main processor 1170, and the main memory 1190 may be embedded in one chip.

According to various example embodiments, the ASIP 1130 may be an integrated circuit customized for a specific use, may support a dedicated instruction set for a specific application, and execute instructions included in the instruction set.

According to various example embodiments, the memory 1150 may communicate with the ASIP 1130 and store a plurality of instructions executed by the ASIP 1030 as a non-transitory storage device, and the memory 1150 may include any type of memory accessible by the ASIP 1130, such as random access memory (RAM), read only memory (ROM), tape, magnetic disk, optical disk, volatile memory, non-volatile memory, and combinations thereof.

According to various example embodiments, by executing a series of instructions stored in the main memory 1150, the ASIP 1130 and/or the main processor 1170 may detect PSSS and SSSS from the wireless signal and perform cell search based on the detected PSSS and SSSS, as described through FIGS. 1 to 9.

According to various example embodiments, the main processor 1170 may control the wireless communication device 1100 by executing a plurality of instructions. For example, the main processor 1170 may control the ASIC 1110 and the ASIP 1130, process data received through a wireless communication network, or process user input to the wireless communication device 1100. In addition, the main memory 1190 may communicate with the main processor 1170 and may store the plurality of instructions executed by the main processor 1170 as the non-transitory storage device.

While the inventive concepts have been particularly shown and described with reference to some example embodiments thereof, it will be understood that various changes in form and details may be made therein without departing from the spirit and scope of the following claims.

What is claimed is:

1. A method of operating an electronic device, the method comprising:

dividing a cell search period into a plurality of partial detection ranges based on a number of partial buffers included in the electronic device and a size of the partial buffers;

obtaining, based on a first synchronization signal, first correlation detection information for first signals received during a first partial detection range among the plurality of partial detection ranges, while temporarily storing the first signals in a first partial buffer among the partial buffers;

obtaining, based on the first correlation detection information for the first signals and a second synchronization signal, second correlation detection information for the first signals, during a second partial detection range among the plurality of partial detection ranges; and obtaining, based on the first synchronization signal, the first correlation detection information for second signals received during the second partial detection range, while temporarily storing the second signals in a second partial buffer among the partial buffers.

2. The method of claim 1, wherein the obtaining of the first correlation detection information for the first signals further comprises:
calculating first correlation values between each of the first signals stored in the first partial buffer and the first synchronization signal;
sorting a set number of the first correlation values in descending order;
determining the set number of the first signals sorted by the first correlation values as candidate paths; and
obtaining the second correlation detection information for the first signals based on the candidate paths.

3. The method of claim 2, wherein the obtaining of the second correlation detection information for the first signals further comprises:
identifying, among the candidate paths, at least one candidate path having a new indicator information equal to a first value; and
calculating a correlation value between the at least one candidate path and the second synchronization signal.

4. The method of claim 3, wherein the obtaining of the second correlation detection information for the first signals further comprises:
identifying, among the candidate paths, a candidate path having the new indicator information equal to a second value, the second value being different from the first value;
bypassing, for the identified candidate path, the calculating of the correlation value between the identified candidate path and the second synchronization signal; and
changing, for the at least one candidate path, the new indicator information with respect to the at least one candidate path where the correlation value is calculated, to the second value.

5. The method of claim 2, further comprising:
alternately storing the signals such that the signals received during the first partial detection range are stored in the first partial buffer and the signals received during the second partial detection range are stored in the second partial buffer.

6. The method of claim 1, wherein the obtaining the second correlation detection information for the first signals is performed in parallel with the obtaining of the first correlation detection information for the second signals.

7. The method of claim 2, wherein the obtaining of the first correlation detection information for the second signals further comprises:
sorting, in descending order, the first correlation values for ones of the first signals determined as the candidate paths and the first correlation values for the second signals to generate sorted first correlation values; and
updating the set number of the first correlation values among the sorted first correlation values as the candidate paths.

8. The method of claim 2, wherein the sorting in descending order further comprises:
classifying the first correlation values according to a primary identification (PID) value into at least a first group and a second group, the PID value indicating whether an external device broadcasting the first synchronization signal and the second synchronization signal to the electronic device is connected to a base station; and
separately sorting each of the first group of the first correlation values and the second group of the first correlation values according to the first correlation values in descending order.

9. The method of claim 1, wherein
the first synchronization signal includes a primary sidelink synchronization signal (PSSS) or a primary synchronization signal (PSS), and
the second synchronization signal includes a secondary sidelink synchronization signal (SSSS) or a secondary synchronization signal (SSS).

10. An electronic device comprising:
a memory including a plurality of partial buffers; and
processing circuitry configured to,
divide a cell search period into a plurality of partial detection ranges based on a size of the plurality of partial buffers,
obtain, based on a first synchronization signal, first correlation detection information for first signals received during a first partial detection range among the plurality of partial detection ranges, while temporarily storing the first signals in a first partial buffer among the partial buffers,
obtain, based on the first correlation detection information for the first signals and a second synchronization signal, second correlation detection information for the first signals, during a second partial detection range among the plurality of partial detection ranges, and
obtain, based on the first synchronization signal, the first correlation detection information for second signals received during the second partial detection range, while temporarily storing the second signals in a second partial buffer among the partial buffers.

11. The electronic device of claim 10, wherein the processing circuitry is configured to,
calculate first correlation values for each of the first signals stored in the first partial buffer,
sort the first correlation values in descending order,
determine a set number of signals among the sorted correlation values for the first signals as candidate paths, and
obtain the second correlation detection information for the first signals based on the candidate paths.

12. The electronic device of claim 11, wherein the processing circuitry is configured to,
identify, among the candidate paths, at least one candidate path having a new indicator information is a first value, and
calculate, for the at least one candidate path, a second correlation value between the at least one candidate path and the second synchronization signal.

13. The electronic device of claim 12, wherein the processing circuitry is configured to,
identify, among the candidate paths, a candidate path having the new indicator information equal to a second value, the second value being different from the first value,
bypass, for the identified candidate path, calculating of the second correlation value, and
change, for the at least one candidate path, the new indicator information with respect to the at least one candidate path where the second correlation value is calculated, to the second value.

14. The electronic device of claim 11, wherein the first signals and the second signals are alternately received during the first partial detection range and the second partial detection range, respectively, and
- the first partial buffer is configured to store the first signals received during the first partial detection range and the second partial buffer is configured to store the second signals received during the second partial detection range.

15. The electronic device of claim 10, wherein the processing circuitry is configured to obtain the second correlation detection information for the first signals in parallel with the first correlation detection information for the second signals.

16. The electronic device of claim 11, wherein the processing circuitry is configured to,
- sort, in descending order, the first correlation values for ones of the first signals determined as the candidate paths and the first correlation values for the second signals to generate sorted first correlation values, and
- update the set number of signals among the sorted first correlation values as the candidate paths.

17. The electronic device of claim 11, wherein the processing circuitry is configured to,
- classify the first correlation values for signals according to a primary identification (PID) value into a first group and a second group, the PID value indicating whether an external device broadcasting the first synchronization signal and the second synchronization signal to the electronic device is connected to a base station, and
- separately storing the first group of the first correlation values and the second group of the first correlation values according to the PID in descending order.

18. The electronic device of claim 10, wherein the first synchronization signal comprises a primary sidelink synchronization signal (PSSS) or a primary synchronization signal (PSS), and
- the second synchronization signal comprises a secondary sidelink synchronization signal (SSSS) or a secondary synchronization signal (SSS).

* * * * *